Patented Nov. 17, 1931

1,832,666

UNITED STATES PATENT OFFICE

NORBERT SPECHT, OF BERLIN-ORANIENBURG, GERMANY, ASSIGNOR, BY MESNE ASSIGNMENTS, TO KREBS PIGMENT AND COLOR CORPORATION, OF NEWARK, NEW JERSEY, A CORPORATION OF DELAWARE

PROCESS FOR THE MANUFACTURE OF A BROWN PIGMENT CONTAINING TITANIUM FROM SLUDGE OF TITANIUM

No Drawing. Application filed June 22, 1926, Serial No. 117,853, and in Germany August 22, 1925.
Renewed April 20, 1931.

If titaniferous iron ores (such as ilmenite, $FeTiO_3$) are treated with sulphuric acid and if the resulting product is dissolved in water, there will be a residue in the form of a sludge. The quantity of the said residue amounts to from 15 to 30 per cent of the ore employed in the process and depends on the composition of the ores. The treatment just referred to has been carried out on a large scale for the production of titanic acid from titaniferous ores. The amount of sulfuric acid required is about two parts of concentrated sulfuric acid to one part of ore. The sulfates of iron and of titanium obtained by treating ilmenite in this manner are dissolved in water. The residue or sludge contains the insoluble impurities of the ore, a small amount of unaltered ore, basic insoluble salts of iron and of titanium, etc. After drying and heating to incandescence, the product contains about from 25 to 40% of titanic oxide. Up to the present it was not possible to utilize the sludge or residues referred to above or to prepare a suitable pigment therefrom. Experiments made with the purpose of working the residues into a brown pigment by means of simple heating to incandescence, have not had any satisfactory results since the products obtained in this way did not prove sufficiently free of acid.

According to the present invention it becomes possible to work this sludge satisfactorily into a brown pigment which is distinguished by its excellent covering capacity and which in addition has also proved an efficient rust-proofing pigment. The conversion of the sludge into pigment is carried out by first neutralizing the sludge completely with alkalies or carbonates of alkali. It has been found suitable to carry through the neutralization with alkalies only to such an extent that the mass will remain slightly acid, and subsequently the remainder of the acid is neutralized by an excess of zinc oxide. Then the residue is washed, filtered, dried, heated to incandescence, and finally ground. In the step of heating to incandescence it is desirable to employ a temperature which is the higher, the darker the tint of the pigment is to be obtained. A suitable range of temperatures for this heating step is from 700 to 850° centigrade. The brown pigment thus obtained can be mixed with white pigments or with other colored pigments, for instance iron oxide red, blanc fixe, zinc oxide, soot and the like.

I claim:

1. In the process for the manufacture of a brown pigment containing titanium from the sludgy residues resulting from the treatment of titaniferous iron ores with sulfuric acid, the successive steps of neutralizing said sludge carefully and then washing, heating, and grinding it.

2. In the process for the manufacture of a brown pigment containing titanium from the sludgy residues resulting from the treatment of titaniferous iron ores with sulfuric acid, the successive steps of neutralizing said sludge carefully by means of alkali, and subsequently neutralizing the slight remainder of acid by means of zinc oxide.

In testimony whereof I affix my signature.

NORBERT SPECHT.